June 29, 1965

D. J. ROTH 3,191,643

MOVING FILLER FOR LIQUIDS

Filed April 16, 1962

INVENTOR.
DONALD J. ROTH
BY
ATTORNEYS

June 29, 1965

D. J. ROTH 3,191,643

MOVING FILLER FOR LIQUIDS

Filed April 16, 1962

INVENTOR.
DONALD J. ROTH
BY
*Moore White & Burd*
ATTORNEYS

INVENTOR.
DONALD J. ROTH

INVENTOR.
DONALD J. ROTH
BY
Moore, White + Burd
ATTORNEYS

United States Patent Office 3,191,643
Patented June 29, 1965

3,191,643
MOVING FILLER FOR LIQUIDS
Donald J. Roth, St. Paul, Minn., assignor to Bemis Bro. Bag Company, Minneapolis, Minn., a corporation of Missouri
Filed Apr. 16, 1962, Ser. No. 187,582
14 Claims. (Cl. 141—137)

This invention is a container filling device for liquids which moves with the conveyor with which it is associated while discharging liquids into containers on the conveyor. After filling one or more containers, the filler nozzles are raised and quickly moved back along the conveyor to empty containers whereupon the nozzles of the device are lowered into new containers and follow them along the conveyor as the filling charges are delivered. The conveyor never stops during the movement of the filler nozzles from, to and with containers. The structure also incorporates novel metering structure in which two different quantities of material may be metered at every actuation of the filler mechanism by simply opening or closing two manual valves. The structure is also novel in providing valve structure for preventing material coming from a reservoir source being imparted directly into the containers without first flowing through the metering system. Movement of the nozzles is controlled by a pair of cams, one of which raises and lowers and the other of which causes forward and backward motion thereof in a properly timed relationship. The nozzle moving cams are secured to a main shaft for the conveyor system to effect precise timing of the filler nozzle movement with the movement of containers along the conveyor path.

Filling devices for liquids, particularly in association with automatic filling machinery employing conveyors, are well known. Furthermore, there are well known structures in which the metering of a liquid into a container is performed by means of a free piston such as that used as the metering structure herein. On the other hand, it does not appear that these structures have ever been combined with a filler mechanism that follows a container carrying conveyor to fill while the containers are in motion. Likewise, the traditional method of adjusting the amount of material metered by the free piston in a cylinder arrangement has been to have either a variable distance stop that stops the piston short of a full throw or a variable position cylinder head that can be moved toward or away from a fixed cylinder head to increase or decrease the size of the cylinder within which the free piston moves. All of these previously known structures have inherent shortcomings that are overcome by the structure of the present inveniton.

For example, in most filling mechanisms where the containers must come to a halt before being filled, an elaborate starting and stopping mechanism is necessarily involved, and furthermore, the rate at which the containers can be moved through the filling structure is reduced. There is also considerable energy expended in merely overcoming inertia.

With respect to means for adjusting the quantity of material metered, the free floating piston in a cylinder having a variable positioned cylinder head has inherent problems in making any major adjustment in the quantity. It is adequate for varying the amount of discharge within rather narrow limits but cannot easily be adapted to measuring greatly differing quantities of liquid. The variable stop arrangement is somewhat limited in that continual movement of the variable stop to make adjustments for quantities is likely to produce leakage eventually. Such leakage both affects the quantity of material metered and also causes wet conditions around the filling apparatus which could be hazardous to workmen employed around the machinery.

Accordingly, it is the principal object of this invention to provide a novel filling device for metering quantities of liquid into constantly moving containers.

It is a further object of this invention to provide a metering device that combines a free floating piston in a measured quantity cylinder as a metering structure combined with nozzles that move with the containers as they are being filled.

It is yet another object of this invention to provide such a free floating piston metering device combined with moving nozzles in which the quantity of liquid can be quickly and easily varied to a substantial degree.

It is yet another object of this invention to provide an adjustable metering device for a metering device metering at least two widely varying quantities in which the variation is accomplished by connecting additional metering cylinders in parallel with the principal metering cylinder.

It is yet another object of this invention to provide a free floating piston metering device in which the piston is powered by material from the reservoir source of material that is to be placed in containers but is never connected directly to the filler nozzles.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which.

Figure 1:
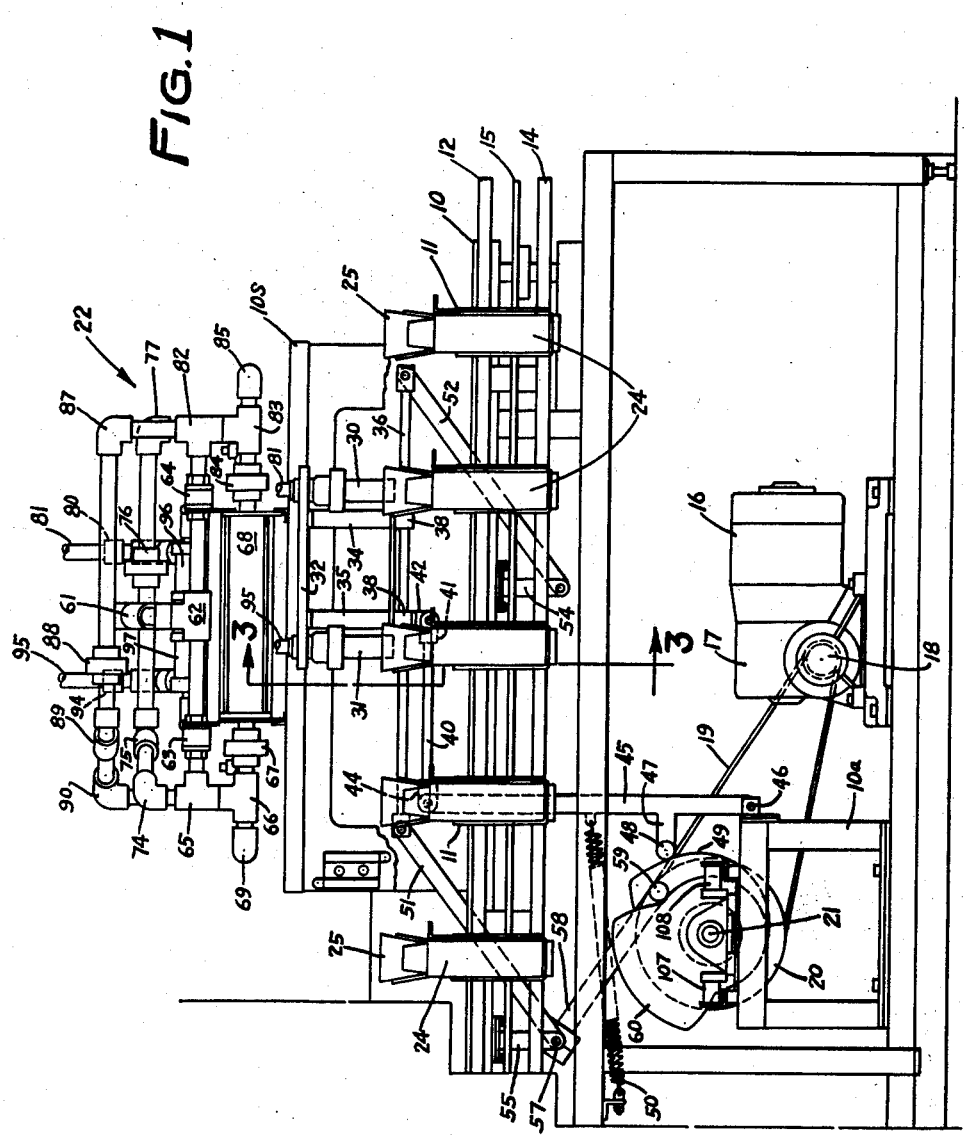
FIGURE 1 is a side elevation of the filler metering structure with broken lines illustrating hidden parts and portions of the machine broken away to illustrate internal construction.
Figure 2:
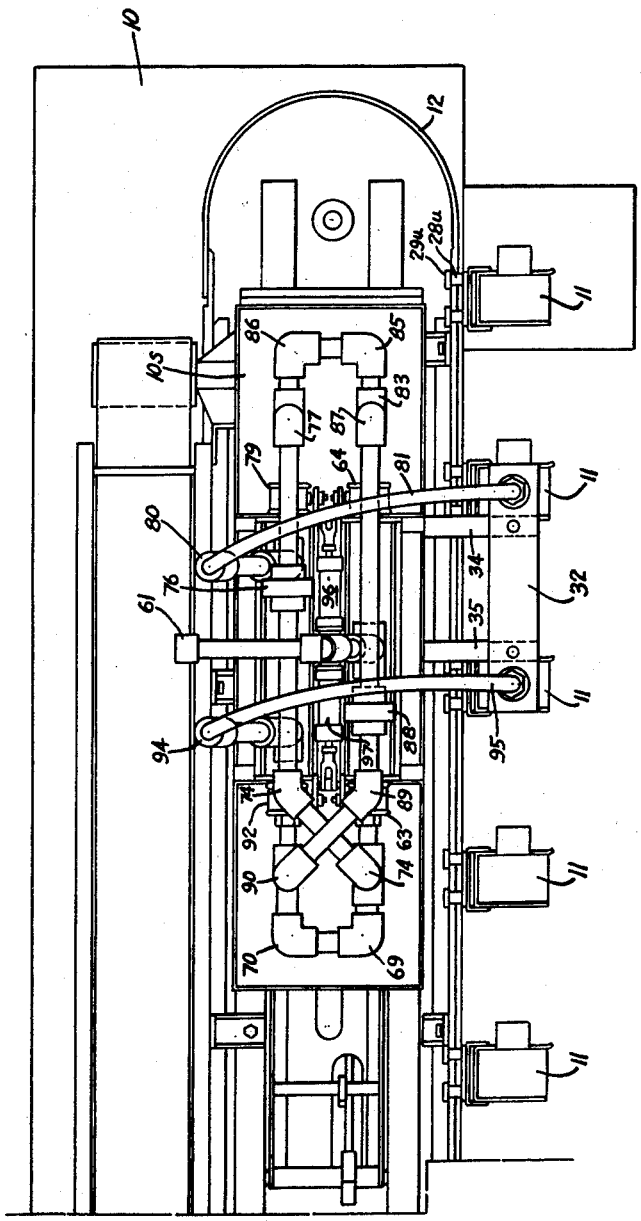
FIGURE 2 is a plan view of the same mechanism shown in FIGURE 1 with broken lines illustrating hidden parts and drawn to the same scale as FIGURE 1.

Referring first to FIGURE 1 of the drawings, the device may be seen provided with a suitable frame 10 to which an endless conveyor is secured. The exact nature of the conveyor is not material except that it should have the characteristics of positive drive and precise spacing of means on it for supporting containers. As shown herein illustratively, a series of pockets 11 are supported in a vertical position by the rails 12 and 14 while a suitable positive drive such as endless conveying chain 15 actually moves the pockets 11 along the rails 12 and 14 at regularly spaced intervals. The conveyor system is driven in any suitable manner as by conventional motor 16 with its integral reduction speed reducing elements 17 which in turn drives the pulley 18. A V-belt 19 is reeved around pulley 18 and pulley 20 which in turn is secured to shaft 21. By a series of conventional gearing shafts and the like, shaft 21 is connected to one of the sprockets around which the chain 15 is reeved.

As can be seen in FIGURE 1, the shaft 21 also carries the cams which actuate the filler nozzle mechanism. The rotation of the conveyor chain 15 around the frame 10, therefore, is positively linked to the action of the filler nozzles. Secured to the base frame 10 is a super structure frame element designated 10S. It carries on it the metering and distribution system generally designated 22. Shown here for illustration of the operation of the machine but constituting no part of this invention as such, are the containers 24 which are shown to consist of a stiff protective outer container and the flexible liquid-proof liner 25. The shaft 21 is shown mounted on an auxiliary frame member 10A which is below the main portion of frame 10 which carries the conveyor.

Figure 3:
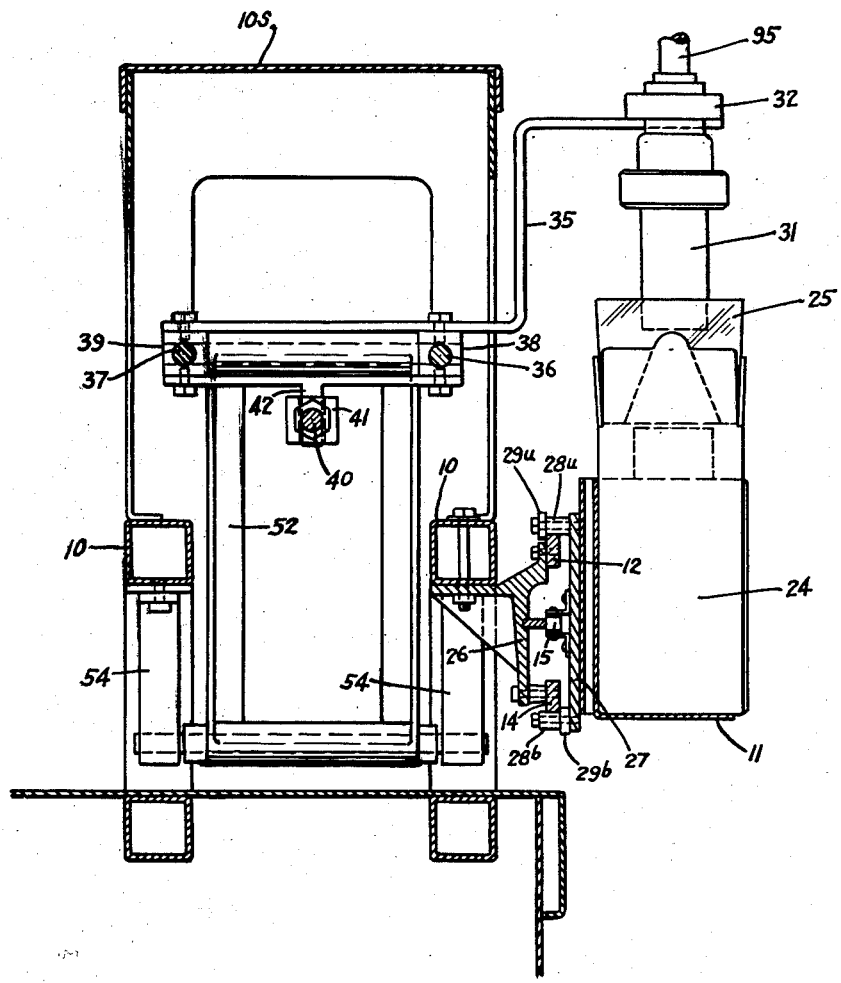
FIGURE 3 is a vertical section taken on the line 3—3 of FIGURE 1 with broken lines illustrating hidden parts; the scale of this figure is substantially larger than that of FIGURE 1.

Although the conveyor as such is not novel, it has some features which, combined with the filler system, are thought to be patentable. As shown in FIGURE 3, the rails 12 and 14 are supported by suitable bracket members 26 that are secured to frame 10 in any suitable manner as by bolting. The tracks are suitably secured, as by cap screws, to the brackets 26. At regularly spaced intervals along the chain 15 are secured the plates 27. Each of these has stabilizing rollers consisting of a cylindrical member having a shoulder which for the upper one designated 28U has the shoulder 29U on the inside of the track to prevent outward movement of that portion of the plate 27 to which the roller is secured. At the bottom may be seen a similar roller 28B and having its shoulder 29B engaging the outside of track 14 to prevent that portion of plate 27 moving inwardly. The pockets 11 are secured to the plates 27 and therefore may be easily removed and replaced by pockets of a different size in order to accommodate containers of a different size for purposes of allowing the machine to be adapted quickly to use its capability of filling cartons of varying sizes.

*Discharge nozzles*

Turning to FIGURE 1, the discharge nozzles 30 and 31 are secured together for simultaneous movement by a yoke 32. This yoke is connected by the brackets 34 and 35 to a pair of rails 36 and 37 (only 36 of which appears in FIGURE 1 but both of which may be seen in section in FIGURE 3). At the lower ends the brackets are provided with the bearings 38 and 39 which actually embrace the rail rods 36 and 37 as shown most clearly in FIGURES 3, 4 and 5, where the bearings engaging both rail rods are shown. Thus, the two nozzles 30 and 31 are supported on the rail rods 36 and 37 but may be slidably moved to and fro thereon by suitable means.

Such a means is illustrated in FIGURES 1, 3, 4 and 5, as being the clevis link 40 which is provided with a clevis 41 and embraces a tongue 42 that extends down from the bottom of bracket 35. A conventional pin or the like holds the clevis 41 to the tongue 42 pivotally. A similar clevis 44 is provided at the other end of the clevis link 40 which is suitably embraced and pivotally attached to the travel arm 45. The lower arm of travel arm 45 is pivoted as at 46 to auxiliary frame 10A. At 47 a finger is secured to the travel arm 45 which has on its outermost cam follower 48. This cam follower engages the cam 49 and is held against it in any suitable manner as by spring 50. Cam follower 48 therefore closely follows the surface of cam 49. If the cam urges follower 48 to the right the traveling arm 45 is pivoted about point 46 with its upper end moving to the right thereby causing the brackets 34 and 35 to move to the right via the clevis link 40 which moves the nozzles in the same direction. When cam 49 rotates so that a low spot on the cam is opposite the follower 48, spring 50 reverses the direction of pivoting of travel arm 45 thus pulling the nozzles to the left.

Figure 4:
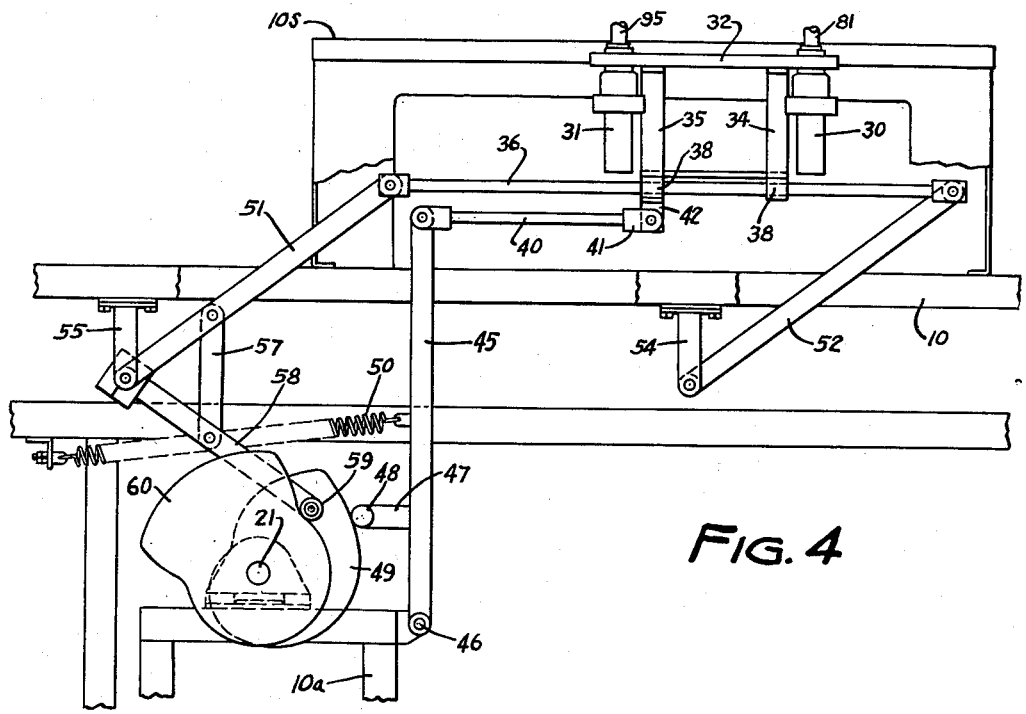
FIGURE 4 is a fragmentary side elevation of the filler nozzle control structure with broken lines illustrating hidden parts and portions of the device broken away so that the mechanism can be clearly seen; the scale of this figure is between that of FIGURES 1 and 3.
Figure 5:
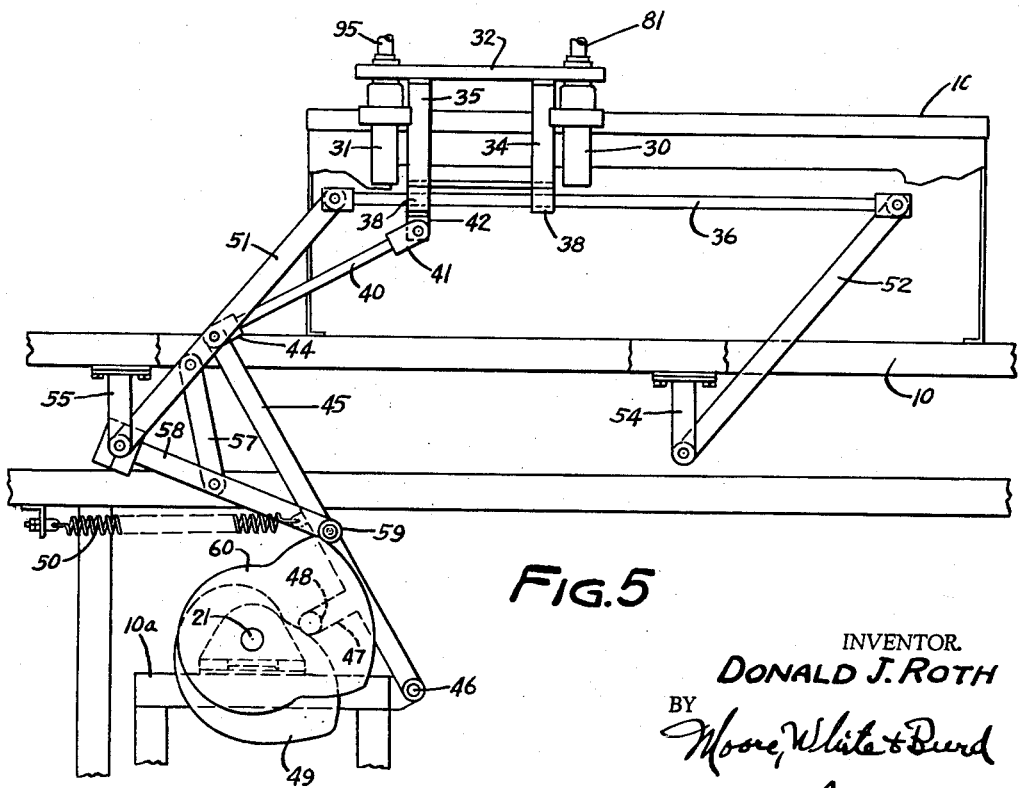
FIGURE 5 is a view of the same mechanism and drawn to the same scale as the structure shown in FIGURE 4 but in an adjusted position compared with FIGURE 4.

The tracks 36 and 37 are supported by the parallel ruler-type links 51 and 52. These links are pivoted to the ends of the tracks 36 and 37 in any suitable manner and similarly to the brackets 54 and 55 which in turn are secured to frame 10. The links 51 have a lever arm 57 rigidly secured to them. Lever arm 57 carries at its lower end a cam follower 58. Brace 58 connects between links 51 and lever 57 to form a rigid structure. Brace 57 is not shown in FIGURE 1. This cam follower closely follows the surface of cam 60. Gravity tends to force the rail structures 36 and 37 downward at all times and holds cam follower 59 in engagement with the cam surface of cam 60. When cam follower 59 is on a relatively low portion of the surface of cam 60, the nozzles are in a lowered position as seen in FIGURE 1. As the cam is rotated by the rotation of shaft 21 to which it is secured, the cam follower 59 moves to the right which pivots the links 51 and 52 toward a vertical position, thus raising the nozzles. In FIGURE 4, the nozzles are shown in a lowered position and at a position somewhat to the left of their most rightward thrust. The cams 49 and 60 rotate in a counterclockwise direction as seen in FIGURES 1, 4 and 5.

*Metering system*

Figure 7:
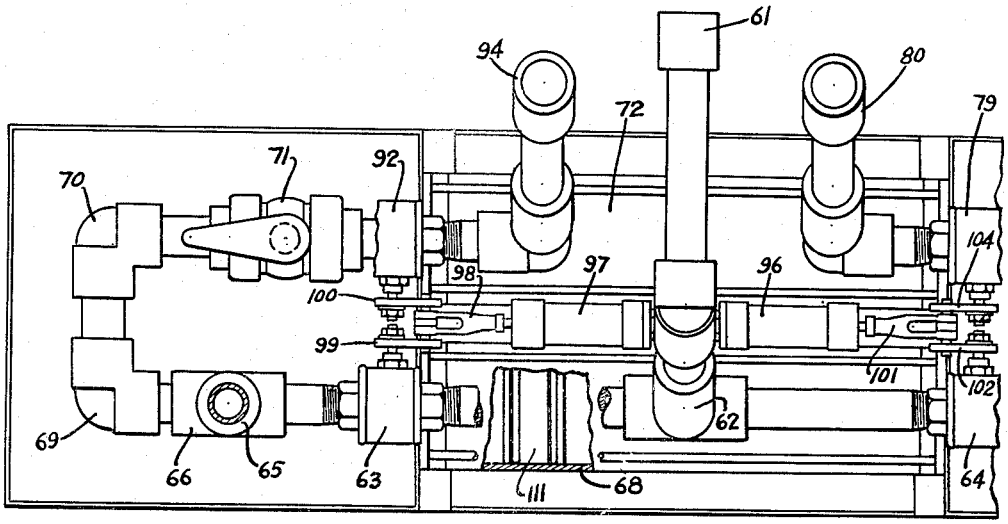
FIGURE 7 is a partial plan view of the structure shown in FIGURE 6 with portions broken away to illustrate construction fully and drawn to the same scale as FIGURES 3 and 6.
Figure 8:
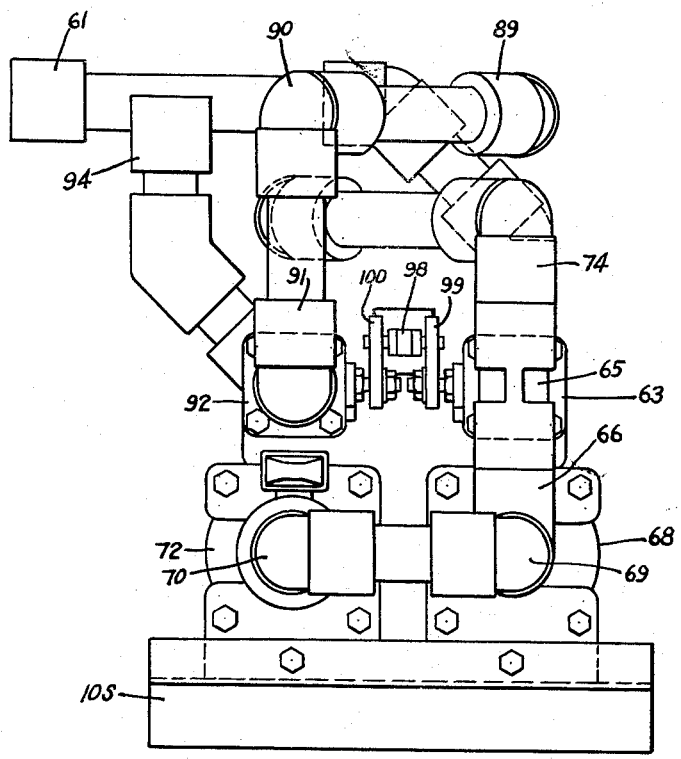
FIGURE 8 is an end elevation of the structure shown in FIGURE 7 viewed from the left, with broken lines illustrating hidden parts.

Turning again to FIGURE 1, the metering system 22 supported on the frame super structure 10S is provided with an inlet 61 which connects to a T-fitting 62 and suitable interconnecting pipes that extend to the valves 63 and 64. From the valve 63 a short conduit connects to a T-fitting 65 which in turn joins a T-fitting 66 that connects at one side through the union 67 to one end of the main metering cylinder 68 and at the other side extends to the elbow 69. As shown clearly in FIGURES 7 and 8, elbow 69 connects via another elbow 70 to manual valve 71 and thence to the auxiliary metering cylinder 72. In FIGURE 7, T-fitting 65 is directly above T-fitting 66 which results in the apparent application of two different numbers to a single part.

Figure 6:
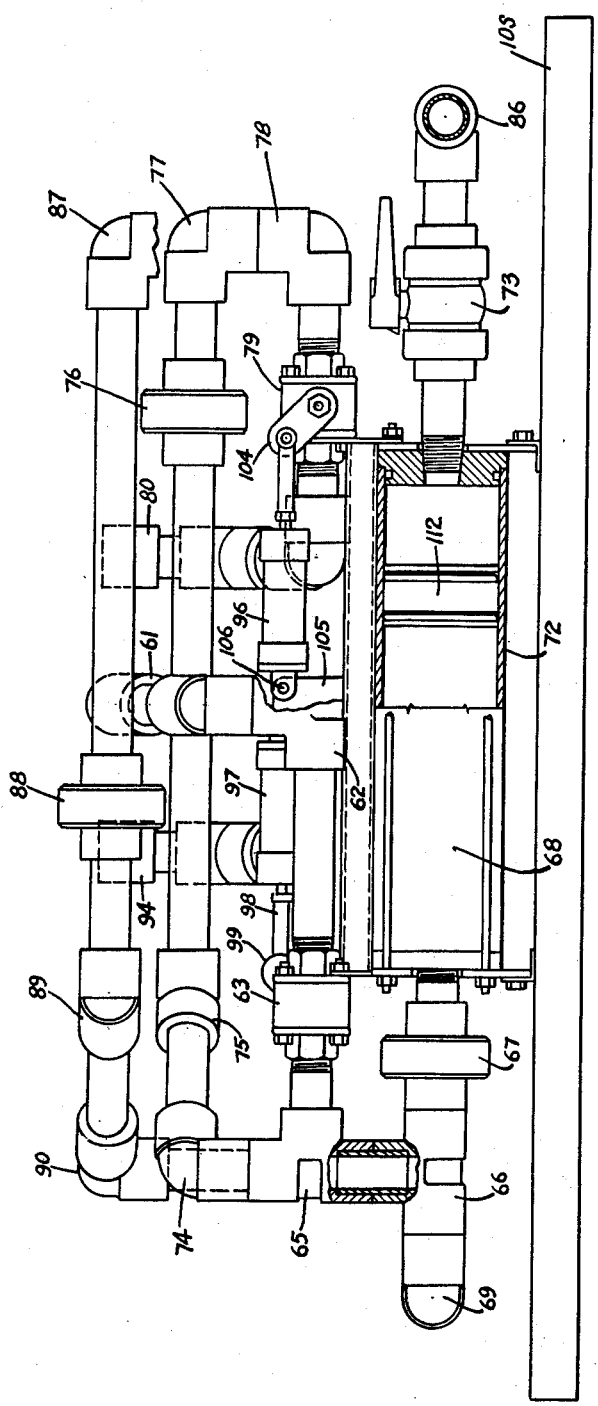
FIGURE 6 is an enlarged fragmentary view, partially in section and partially in side elevation, illustrating the structure of the metering device itself with broken lines illustrating hidden parts; the scale used is that of FIGURE 3.

The other branch from T-fitting 65, see FIGURE 6, connects via elbow 74, elbow 75, union 76, elbow 77 and elbow 78 to valve 79 which controls whether or not the flow through the path just described can reach the nozzle connection 80. As shown in FIGURE 1, the nozzle connection 80 is provided so that a flexible hose 81 may be connected thereto and provide a yielding but liquidtight connection to nozzle 30. The numeral 81 has been put on both ends of the flexible hose 81 which is broken away in FIGURE 1 in order not to obscure structure that would be behind it in the side elevational view.

From valve 64 a similar arrangement is provided. One branch of T-fitting 82 connects to a lower T-fitting 83 and through a union 84 to the opposite end of the main metering cylinder 68. T-fitting 83 also connects through an elbow 85 across to the other side of the machine and (as shown in FIGURE 6) through an elbow 86 and valve 73 that are the counterparts of elbow 70 and valve 71. Valve 73 connects also to the opposite end of auxiliary metering cylinder 72 from that to which valve 71 connects.

From the other branch of T-fitting 82, a pipe extends to the elbow 87 and through a connecting pipe to union 88 and the elbows 89 and 90 to the elbow 91 and thence to the valve 92, which is the counterpart of valve 79, that controls the flow of fluid to nozzle connection 94. Valve 92 and nozzle connection 94 are shown clearly in FIGURES 7 and 8. The nozzle connection 94 communicates with a flexible hose 95 which is the counterpart of flexible hose 81 and connects directly with the nozzle 31, for which reason the number 95 has been placed on both ends of the flexible hose. Flexible hose 95, like flexible hose 81, is broken away in order not to obscure other structure in FIGURE 1.

*Control mechanism for metering system*

In FIGURES 1, 2, 6, 7 and 8 may be seen the air cylinders 96 and 97. Cylinder 97 is connected by suitable conventional arrangement such as clevis 98 to the control arms 99 and 100 of the valves 63 and 92 respectively. Cylinder 96 is provided with an identical clevis 101 that connects to the valve control arms 102 and 104 of the valves 64 and 79 respectively. As shown in FIGURE 6 for air cylinder 96, the air cylinders are pivoted to a fixed support 105 that is secured to some stationary portion of the machine and a pivot pin as at 106 pivotally secures the end of the cylinder to the support 105. When the cylinder is retracked as shown in all of the figures, the cylinder 96 is a substantially horizontal position. When the cylinders are provided with air as to cause them to extend, the ends of the control arms move in an arc. In so doing, the cylinders must be free to move upward at their ends secured to the arms 99, 100, 102 and 104 to follow the arcs inscribed by the ends of the arms. Cylinder 97 is provided with a similar mounting structure to that shown in FIGURE 6 for cylinder 96.

In FIGURE 1 may be seen the air control valves 107 and 108. These valves control the action of air cylinders 97 and 96 respectively and are spring loaded in one position of valving and operated in the opposite position of valving by suitable means such as cams which are the structural drawings but are illustrated diagrammatically at 109 and 110 in FIGURES 9 and 10. These cams are mounted on shaft 21 so that they are timed with the movement of the nozzles to close all valves when the nozzles are elevated and being returned to a righthand position in order to be engaged into empty containers and to operate alternately while the nozzles are positioned in containers and moving with them to discharge liquid first through one nozzle and then through the other in order to fill each of the two containers.

As shown in FIGURE 7, the metering cylinder 68 is provided with a free floating internal piston 111, and the auxiliary cylinder 72 has a similar piston 112 shown in FIGURE 6.

*Operation*

In order to operate the machine, the first step is to install the correct size of pockets 11 on the conveyor structure to receive the size of cartons to be filled. Valves 71 and 73 are checked to make sure that they are closed if containers having one cylinder capacity are being filled. Valves 71 and 73 are opened if containers having two cylinder capacity are being filled. The machine is cycled to place the nozzles in a position that permits the conveyor to be filled with cartons. The connection 61, of course, is connected by a suitable liquid-tight conduit to a reservoir source of liquid intended to be placed into the cartons. This liquid must be in a reservoir having a head or other pressure that will cause the free floating pistons 111 and 112 to move within their cylinders when head pressure of the reservoir is supplied thereto. The system must be operated sufficiently to assure that the entire system is filled with a liquid and that there is no air remaining in the system before an attempt is made to fill cartons. Once the machine is fully charged, however, containers are simply loaded onto the conveyor belt and the machine is started in operation. With the rotation of shaft 21, as the conveyor starts to move, the nozzles 30 and 31 are lowered into a pair of containers. Thereafter, one of the cams 109 and 110 moves one of the valves 107 and 108 to a position causing its air cylinder to move to a position the reverse of that shown in FIGURE 1. In so doing, the two valves associated with that air cylinder are opened, the other two remaining closed.

Figure 9:
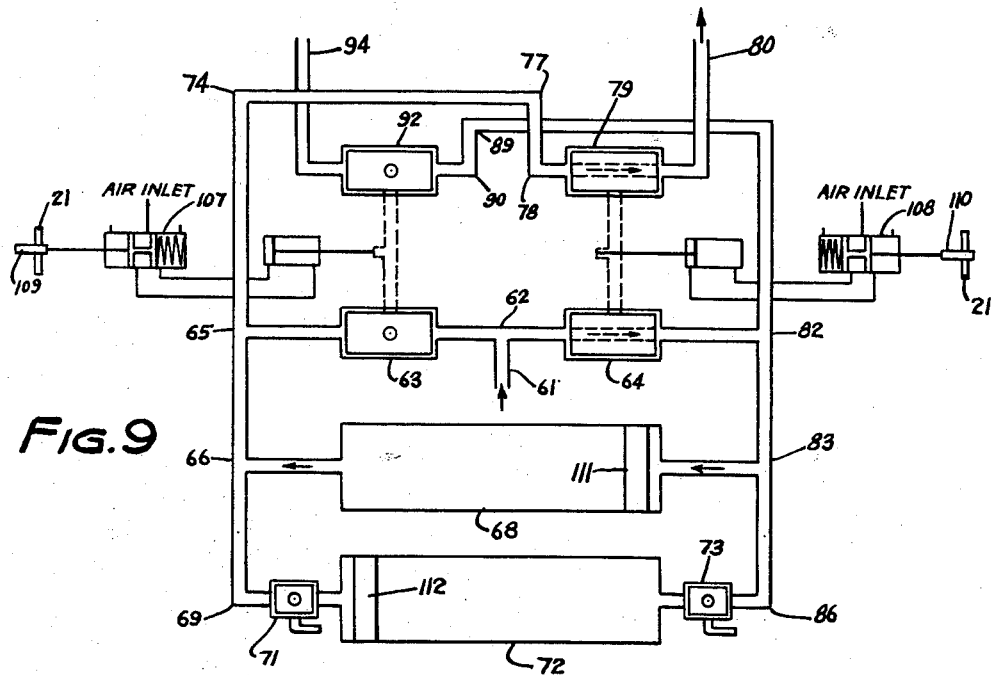
FIGURE 9 is a diagrammatic representation of the interconnection of the control valves and metering cylinders; it is not drawn to scale.

This condition of the machine is shown diagrammatically in FIGURE 9. In that figure, the cam 110 has moved valve 108 so as to extend the air cylinder 96. In so doing, the valves 79 and 64 are moved to the open position as represented by the broken lines in those diagrammatic valves showing a channel extending through the valve body. At the same instant, valves 63 and 92 remain closed as illustrated diagrammatically by showing the channel of the valve extending vertically and at right angles to the connecting tubing. Under these circumstances, liquid from the reservoir applied at 61 will be applied equally against the valve 63 and valve 64. Valve 63, being closed, the liquid flows outwardly through valve 64 to the T 82 and hence to the main metering cylinder 68. The main cylinder 68, of course has previously been filled with liquid by charging the machine as indicated heretofore, and with the application of liquid to the piston 111 in cylinder 68, moves from right to left and causes a discharge of liquid through the union 67 and T-fitting 66, thence through T-fitting 65 at valve 63, which is closed, and also down the line to elbows 74, 77 and 67 through valve 79 and out the discharge nozzle connection 80.

Figure 10:
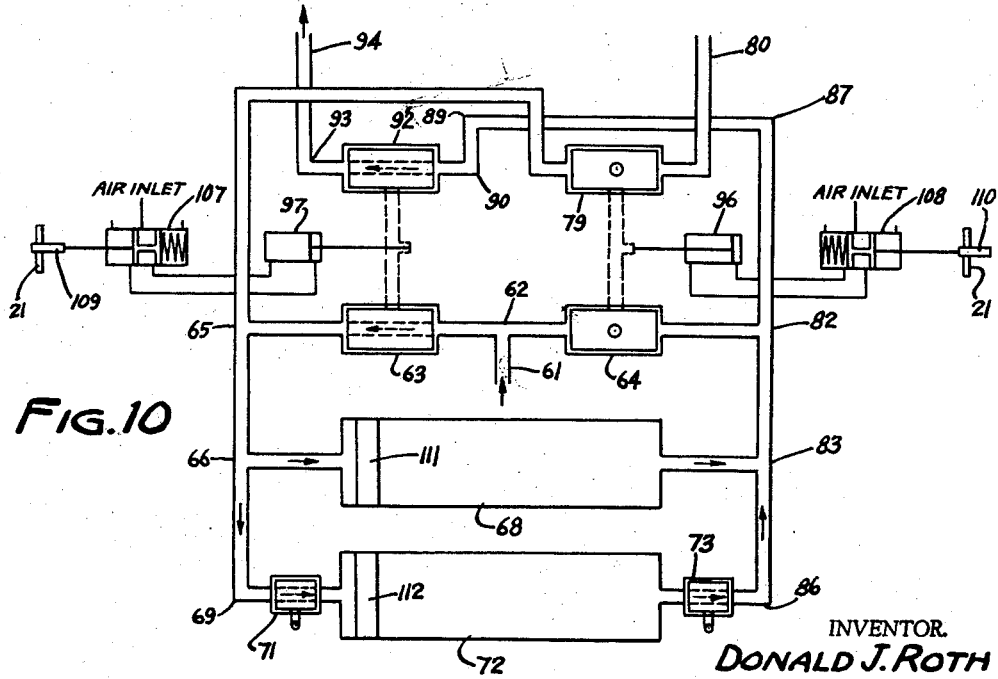
FIGURE 10 is a view similar to FIGURE 9 in an adjusted position relative to FIGURE 9.

Once the charge in cylinder 68 has been discharged by the movement of piston 111 from the righthand side to the lefthand side in the cylinder has taken place, the cam 110 will rotate to a position in which it will no longer place valve 108 in the position shown in FIGURE 9 but instead will cause it to assume the position illustrated in FIGURE 10.

At the same time, the cam 109 will be rotated as the result of its also being connected to shaft 21 so as to place the valves 107 in the position shown in FIGURE 10, whereupon the valves 63 and 92 will be placed in an open position and the valves 64 and 79 will be placed in a closed position. The change in the position of the valves thus will cause an application of reservoir head pressure from inlet 61 through valve 63 to the lefthand side of the piston 111 in cylinder 68. The piston 111 will move to the right and eventually cause a discharge of the contents of cylinder 68 through the nozzle connection 94. In each cycle of the operation of the valve system, of course, there will be a cooperating operation of the mechanism for moving the nozzles 30 and 31 to the left, as shown in FIGURES 1, 4 and 5.

Operation of cams 109 and 110 are mutually exclusive in terms of causing the valves 107 and 108 to be moved to a position causing actuation of the air cylinder controlled thereby but both operate solely during the time when the filler nozzles are in and moving with containers on the conveyor.

In FIGURE 10 is illustrated the condition of the filler mechanism when a larger container is being filled. In that view, the manual valves 71 and 73 have been placed in an open position. At the same time valves 63 and 92 have been opened by the application of air pressure to the rear of air cylinder 97. Liquid from the reservoir source will be applied from inlet 61 through valve 63 to the lefthand ends of both cylinders 68 and 72 in this instance and both of the pistons 111 and 112 will be moved to the right, thus expelling liquid outward through valve 92 and nozzle connection 94 to fill one of two liquid containers requiring the double quantity of liquid. Upon a reversal of the positions of valves 107 and 108, the two pistons will be moved in the opposite direction and discharge a load through nozzle 80. Thus, in order to prepare the metering system for a larger measured charge, the two valves 71 and 73 merely need be opened; to rduce the charge, closed.

It is apparent that many modifications and variations of this invention as hereinbefore set forth may be made without departing from the spirit and scope thereof. The specific embodiments described are given by way of example only and the invention is limited only by the terms of the appended claims.

What is claimed:

1. A filler mechanism comprising at least one filler nozzle, a bracket supporting said filler nozzle, tracks slidably supporting said bracket, means for supporting said tracks as to be vertically movable, means for raising and lowering said tracks, means for sliding said bracket to and fro on said tracks, metering means communicating with said discharge nozzle for discharging liquid therefrom whenever said nozzle is lowered and withholding the discharge of liquid therefrom whenever said nozzle is raised, said track raising and lowering and said metering means discharge all being controlled by means the action of which are positively related to each other mechanically.

2. The structure of claim 1 in which said means for controlling said track raising and lowering and said metering means discharge comprise cams all secured to a common shaft.

3. A filler mechanism comprising a frame, links of equal length pivoted to said frame in spaced relation like parallel rulers, tracks secured pivotally to said links and spaced the same distance as at said frame, a lever secured to at least one of said links, means for moving said lever to pivot the link to which it is secured and cause thereby pivoting of all the links to raise and lower said tracks alternately while retaining them in a horizontal position relative to said frame, a nozzle, a bracket slidably engaging said tracks and supporting said nozzle, means for sliding said bracket to and fro on said tracks in one direction when said tracks are raised and the other when lowered, metering means secured to said nozzle for discharging liquid therefrom whenever said nozzle is lowered and withholding the discharge of liquid therefrom whenever said nozzle is raised.

4. The structure of claim 3 in which said metering means, the pivoting of said lever, and said means for moving said bracket to and fro on said tracks comprise cams secured to a common shaft.

5. A filling mechanism for use with a constantly moving container conveyor, the filling mechanism comprising a frame, a pair of tracks vertically movable on said frame while held in a horizontal attitude with respect to said constantly moving conveyor and extending parallel thereto, brackets slidably mounted on said tracks, at least two nozzles supported by said brackets, means for raising said tracks when said nozzles are slidably moved thereon in one direction and lowering said tracks when said nozzles are slidably moved thereon in the other direction, metering means supported near said nozzles, said metering means comprising a cylinder having first and second ends, a piston within said cylinder, means for moving said piston to and fro in said cylinder, first and second valves connected to the first and second ends of said cylinder in a liquid-tight arrangement, said first valve connected also to a source of liquid and said second valve being connected also to the first of said nozzles, third and fourth valves being connected in parallel arrangement with said second and first valves respectively with relation to said cylinder, said third valve connected also to said source of liquid and said fourth valve connected also to a different one of said nozzles, mechanical means interconnecting said first and second valves for actuating them simultaneously, linkage connected between said third and fourth valves for actuating them simultaneously, and means for actuating said mechanical means and linkage in a mutually exclusive manner and said piston to and fro while said tracks are lowered.

6. The structure of claim 5 in which there is a second cylinder like said first cylinder, a first manual valve connected between one end of said second and first cylinders, and a second manual valve connected between the other end of said first and second cylinders.

7. The structure of claim 6 in which the pistons of said first and second cylinders are provided with free or floating pistons and said source of liquid is under pressure.

8. The structure of claim 5 in which the piston of said cylinder is free or floating and said source of liquid is under pressure.

9. The structure of claim 5 in which the operation of said means for raising and lowering said tracks, said means for moving said brackets to and fro and said means for actuating said mechanical means and linkage in a mutually exclusive manner are all positively interconnected mechanically.

10. The structure of claim 9 in which said means for raising and lowering said tracks, said means for moving said brackets to and fro and said means for actuating said mechanical means and linkage in a mutually exclusive manner comprise cams mounted on a single shaft.

11. The structure of claim 9 in which links are pivoted by one end to said frame in spaced relation, said tracks are pivoted to the other ends of said links with the same spacing as at said frame whereby said track links and frame form a structure like parallel rulers, a lever having a free end and secured by its other end to the links at one end of said tracks, a cam follower at the free end of said lever, a shaft rotatable on said frame near said cam follower, and a cam on said shaft engaging said cam follower, a second cam on said shaft, a second cam follower engaging said second cam, mechanical linkage interconnecting said second cam and said brackets, third and fourth cams on said shaft, and means engaged with said third and fourth cams on said shaft and operatively associated with said pairs of valves.

12. A filler mechanism comprising at least one filler nozzle, a bracket supporting said filler nozzle, tracks slidably supporting said bracket, means for supporting said tracks horizontally as to be vertically movable, means for raising and lowering said tracks, means for sliding said bracket to and fro on said tracks, variable capacity metering means communicating with said discharge nozzle for discharging liquid therefrom whenever said nozzle is lowered and withholding the discharge of liquid therefrom whenever said nozzle is raised, said track raising and lowering and said variable capacity metering means discharge all being controlled by mechanically interrelated means, an endless conveyor extending at least in part parallel to said tracks, said endless conveyor comprising guide rails, an endless powered means therebetween, plates movable on and stabilized by said guide rails and secured to said endless powered means and pockets removably secured to said plates.

13. A filler mechanism for filling containers with liquid comprising: a metering system including a cylinder having a capacity for a measured quantity of liquid, a piston in said cylinder, means for moving said piston to and fro in said cylinder, a first pair of valves one of which is connected to one end of said cylinder and the other connected to the other end of said cylinder, the first valve of said first pair being connected also to a source of liquid, a first discharge nozzle, the second valve of said first pair being connected to said first discharge nozzle, a second pair of valves the first of which is connected to said other end of said cylinder, a second discharge nozzle, the second valve of said second pair communicating with said first end of said cylinder and said second discharge nozzle, said first valve of said second pair connected also to said source of liquid, means for operating said first pair of valves simultaneously, means for operating said second pair of valves simultaneously, means positively relating the action of said valve operating means to each other to actuate said pairs of valves oppositely to each other, a second cylinder, piston and piston moving means like said first cylinder, piston and piston moving means, a first manual valve interconnecting one end of said first and second cylinders, a second manual valve interconnecting the other ends of said first and second cylinders, a frame, said metering system supported by said frame, means secured to said frame and said discharge nozzles for supporting and moving said discharge nozzles vertically and horizontally adjacent to a portion of said frame, a conveyor comprising guide rails extending along said frame at least in part below the path of said discharge nozzle, plates movably supported and stabilized by said guide rails, an endless powered means extending along the path of said guide rails, means securing said plates to said endless powered means and pockets of at least two different sizes removably secured to said plates.

14. A liquid metering system comprising: a cylinder having a capacity for a measured quantity of liquid, a piston freely movable within said cylinder, a first pair of valves the first one of which is connected to one end of said cylinder and the other connected to the other end of said cylinder, the first one of said first pair of valves connected also to a source of liquid under pressure, the second of said first pair of valves connected also to a discharge nozzle, a second pair of valves corresponding to said first pair of valves and similarly but oppositely connected to said cylinder, the first one of said second pair of valves connected also to a source of liquid under pressure, the other of said second pair of valves connected also to a different discharge nozzle, means for operating both of said first pair of valves simultaneously, means for operating both of said second pair of valves simultaneously, means relating said valve operating means to each other to operate said first and second pairs of valves oppositely to each other; a second cylinder like said first cylinder, a piston freely movable within said second cylinder, a first manual valve connected between one end of said second cylinder and the corresponding end of said first mentioned cylinder, and a second manual valve connected between the other end of said second cylinder and the end of said first cylinder opposite said corresponding end thereof.

References Cited by the Examiner
UNITED STATES PATENTS

| | | | |
|---|---|---|---|
| 1,992,464 | 2/35 | Blackman | 141—137 XR |
| 2,755,966 | 7/56 | Lindars | 222—250 |
| 2,765,817 | 10/56 | Grzenkowski et al. | 222—250 XR |

FOREIGN PATENTS

| | | |
|---|---|---|
| 271,154 | 1/51 | Switzerland. |

LAVERNE D. GEIGER, *Primary Examiner.*